Patented Oct. 26, 1926.

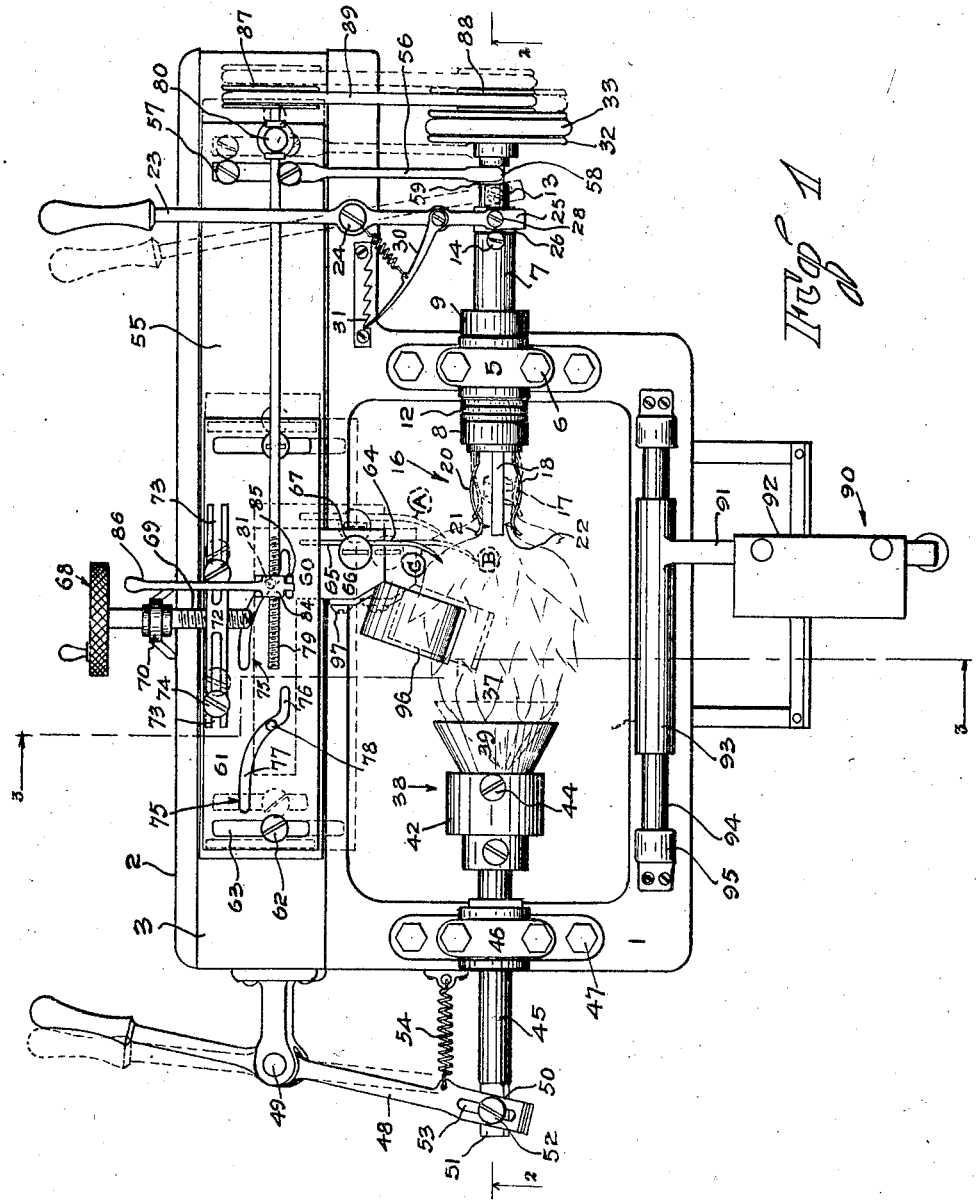

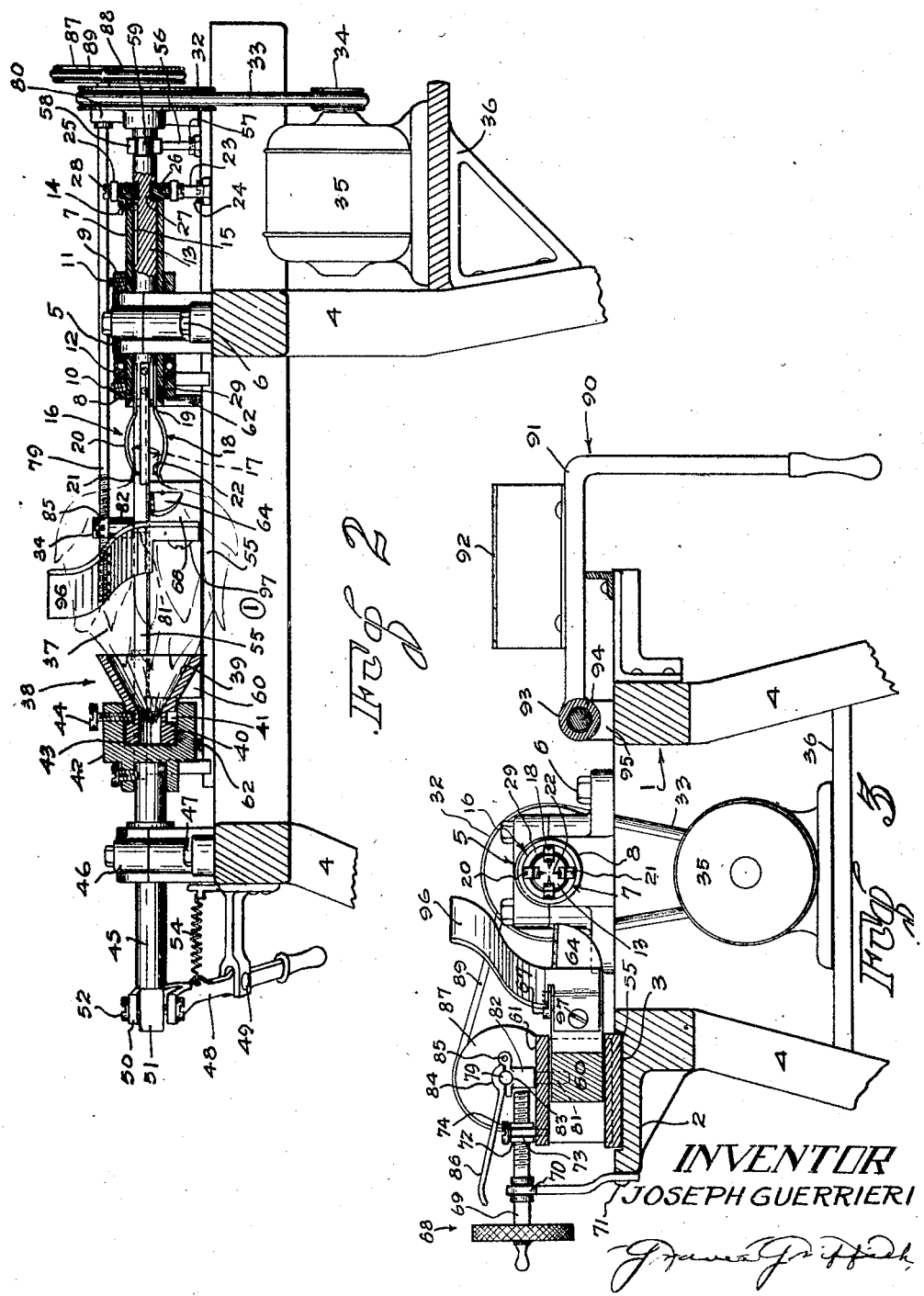

1,604,347

UNITED STATES PATENT OFFICE.

JOSEPH GUERRIERI, OF SAN FRANCISCO, CALIFORNIA.

ARTICHOKE TRIMMER.

Application filed July 28, 1925. Serial No. 46,526.

The present invention relates to improvements in automatic devices for removing the outer covering, or protective surface, from fruits and vegetables, and more particularly to those adapted for the removal of the non-edible portions of the unvolucral bracts constituting the globular covering of the flower of the artichoke.

A principal object of my invention is the provision of means whereby the inedible portions of the laminated scale-covering of the flower of the artichoke may be removed speedily, leaving intact the edible fleshy bases, together with their receptacles, for table. or canning, use.

Briefly, the device comprises a combination mechanism, by means of which the artichoke is held, as in a chuck, and caused to rotate rapidly, while, at the same time, an adjustably secured trimming blade is brought into position to contact with the artichoke near its base and set to cut through the first series of laminations just above their fleshy bases, the mechanism operating this blade being of a character to give it a movement compelling it to follow the globular configuration of the artichoke and severing successively each succeeding series of laminations just above their edible bases, leaving these bases in their receptacles and therethrough, united to the edible heart of the vegetable.

In the accompanying drawings, forming a part of this specification, and in which similar characters of reference refer to like parts, throughout;

Figure 1 is a top plan view of a machine embodying the principles of my invention, showing an artichoke in place and as held by the chuck while being trimmed, the machine being shown in operation, with the blade and co-related mechanisms advanced substantially mid-way in the trimming operation, the dotted positions indicating the relative positions of these elements at commencement of the trimming operation;

Figure 2 is a vertical sectional detail of a portion of the frame and base-plate, showing the mounting of the drive-shaft, gripping-chuck, guide-chuck and driving motor, the view being taken on line 2—2 of Figure 1;

Figure 3 is a transverse section taken through the base plate, showing the relative positions of the chuck, blade carriage and its adjustments, and the stem cutter, the view being taken on line 3—3 of Figure 1.

Referring with greater particularity to the drawings, my invention comprises, a base plate 1 of rectangular shape, bearing an extension 2 provided with a guide-way 3, the whole being supported by a suitable supporting frame 4. A centrally disposed bearing 5 is bolted to the base-plate 1 by bolts, or cap-screws, 6 and is adapted to support the chuck shaft bearing sleeve 7, this sleeve being revolubly mounted therein and provided with collars 8 and 9 held rigidly with said sleeve by set-screws 10 and 11 and an intermediate thrust bearing 12, said thrust bearing and collars preventing the longitudinal movement of the sleeve with respect to the bearing 5, but permitting its free rotary movement in the said bearing. A longitudinally movable chuck shaft 13 is fitted within the sleeve 7 and splined thereto by means of the set-screw 14 adapted to rest in the keyway 15 and fitted for rotary movement with said sleeve and, also, for longitudinal movement relative to the sleeve when actuated by means of a shift-lever hereinafter described. The inner end of the chuck shaft 13 is provided with an adjustable chuck 16 adapted to tightly grip an artichoke stem 17, said chuck being constructed of a plurality of resilient spring members 18 set in opposite and directionally opposed pairs secured at their inner ends to the chuck shaft by means of screws, or the like, 19, said spring members being bowed outwardly at 20 and terminating in up-turned ends 21 having inwardly extending prick-points 22 adapted to enter the artichoke stem 17. The spring members 18 forming the chuck 16 tend to normally contract, as shown in Figure 3, so that, upon the insertion of an artichoke stem therebetween, they are expanded slightly, with the prick-points in engagement with and about the stem. The means for contracting the chuck 16 comprises a shift-lever 23 pivoted to the base-plate extension 2 of the frame at 24 and provided at its inner end with a forked member 25 adapted to receive a split collar 26 loosely mounted in a groove 27 formed in the chuck shaft 13 adjacent the end of the sleeve 7, said collar being pinned to the fork-arms by means of screws 28 and adapted to be shifted to the dotted position, Figure 1, to draw the chuck shaft outwardly relative to the sleeve 7, thereby drawing the bowed portions 20 of the chuck members 18 into contact with the counter-sunk end 29 and causing their compression against the artichoke stem and the insertion thereinto of the prick-points 22, whereupon the lever 23 is shifted back to normal position, as shown in full line, Figures 1 and 2, and held in this position by means of a spring pressed pawl 30 and rack 31 mounted upon the frame. The outer end of the chuck shaft 13 is provided with a pulley 32 connected by a belt 33 to the motor pulley 34 mounted upon the drive shaft of the motor 35, the motor being mounted below the base-plate upon a bracket 36 secured to the frame below the plate 1. The outer end 37 of the artichoke is held in aligned position with the chuck shaft 13 by means of an auxiliary guide chuck 38 having a conical shaped member 39 adapted to embrace the artichoke end and to rotate therewith, said guide chuck having a collar 40 integrally formed with the conical member 39 and provided with an annular groove 41, the collar 40 thereof being fitted within a bearing member 42 having a bore 43 to receive it and allow of free rotary movement therein, there being provided a set-screw 44 entering this groove for holding it in place, said bearing member 42 being mounted upon the end of a longitudinally movable shaft 45 positioned in alignment with the chuck shaft and borne by the bearing 46 mounted upon the base-plate by cap screws or the like, 47. The guide chuck 38 is normally held against the artichoke end by means of a spring actuated lever 48 pivotally mounted at 49 to the end of the base-plate and provided with a forked end 50 adapted to embrace the squared outer end 51 of the shaft 45 and pivotally secured thereto by the screws 52 extending through the slotted openings 53 formed in the forked end of the lever, the urge of the spring 54 tending to force the conically shaped member of the guide chuck tightly upon the artichoke end, to compel rotation therewith, without wabbling, when driven by the clutch shaft 13.

The blade adjusting and feeding mechanism comprises a plate 55 mounted for longitudinal movement in the guide-way 3 and connected to the chuck shaft 13 by an arm 56 regidly secured thereto by cap-screws 57 and bearing a forked end 58 adapted to embrace the reduced portion 59 of said chuck shaft, so that upon longitudinal movement of the chuck shaft, through the agency of the lever 23, the plate 55 will be correspondingly moved, or shifted, therewith. An L-shaped blade, or cutter, block 60 is superimposed upon the plate 55 and adapted for longitudinal movement therewith and with respect thereto, and, also, for lateral movement relative thereto. A cam-plate 61 is superimposed upon the blade-block 60 and connected to the plate 55 by means of bolts 62 and adapted for longitudinal movement with said plate 55, but laterally adjustable thereto by means of slotted openings 63. The blade, or cutter, 64 is mounted in a slot 65 formed in the extension 66 of the blade-block 60 and is adjustably clamped in said slot by means of a set-screw 67, the blade being provided with a curved outer end bearing the cutting edge somewhat obliquely disposed relative to the blade shank, Figure 1. The blade is adjusted to cutting position by means of a screw adjustment comprising a hand-wheel 68 bearing a screw 69 mounted for rotary movement in the bearing 70 secured to the baseplate extension by screws 71, the screw 69 being tapped into a cross-head 72 provided with slotted ends 73 adapted for sliding engagement with cap-screws 74, which are tapped into the cam-plate 61 thereby providing for the lateral adjustment of this plate but permitting of its longitudinal movement with the plate 55. The cam-plate 61 is provided with a plurality of cam-slots 75, Figure 1, comprising elongated parallel sections 76 and substantially arcuate sections 77 adapted to receive and guide pins 78 extending from the cutter-block 60, which operate to guide said cutter-block and cutter, first in a straight course while traveling through the section 76, and then in an approximately semi-ovoidal course while traveling through the section 77 to give to the rapidly rotating artichoke an ovoid trim. The cutter-block is moved through said course, relative to the cam-plate 61 and plate 55, by means of a screw-feed mechanism consisting of a screw-threaded rod 79 secured at one end to a swivelled post 80 mounted on plate 55 adjacent its outer end and adapted to allow of oscillatory movement of said rod 79 to compensate for the movement of the cutter-block, the inner screw-threaded end of the rod being adapted for connection to the cutter-block by the pin 81 which operates in one of the cam-slots 75 and is positioned in longitudinal alignment with the pin 78 with which it co-acts in the actuation of the cutter-block, the upper end of the pin 81 being provided with a bearing member 82 having a bearing orifice 83 adapted to bear and guide the threaded portion of the rod and provided with a hinged upper member 84 hinged at the point 85 to the bearing member 82, said hinged member 84 being provided with a screw-threaded inner surface adapted to contact the threaded portion of the rod when pressed downwardly thereagainst by pressure applied upon the lever 86 integrally formed with the member 84, the rod being allowed to run free upon release of said pressure, so that the cutter-block 60 and knife 64 will be actuated by the pins 78 and 81 traversing the cam-slots 75 so long as pressure is maintained upon said lever 86 to cause the screw-threaded member to grip the continuously rotating rod 79. The rod 79 is continuously rotated by means of a pulley 87 mounted thereon adjacent the swivelled post 80 and connected to the chuck shaft 13 by means of pulley 88, mounted upon said shaft adjacent the pulley 32, and a belt 89. A stem cutter 90 is mounted upon the base-plate of the machine and comprises a lever 91 carrying a knife blade 92, said lever being adapted for swinging movement by means of an integrally formed sleeve 93 supported by a rod 94 borne by bearings 95 secured to the upper face of the base-plate, Figures 1 and 2, the knife blade 92 being positioned to swing past the extremities of the chuck 16 to sever the stem 17 close to the body of the artichoke, through rotation of said stem against the blade.

The cutter-blade extension 66 is provided with an angularly disposed guard 96 secured thereto by means of screws 97 and positioned to bear against the leaves of the artichoke to hold them firmly against the body portion while the cutter is in operation, said guard being disposed adjacent the cutter and adapted to follow the movement of the cutter and cutter-block in their semi-ovoidal path of travel, but to normally bear at all times throughout this travel as nearly as possible against the artichoke contour.

In placing an artichoke in the machine, the guide chuck 38 is first drawn back by manipulation of the lever 48, the artichoke then being placed in alignment with the chuck shaft with its stem toward the chuck 16 into which it is inserted by placing the stem, by forcing, between the spring members thereof, with the artichoke abutting against the ends of said spring members and its opposite end centered in the guide chuck, after which the guide chuck lever is released, thereby centering and clamping the artichoke between the guide chuck and chuck 16. The lever 23 is then manipulated to draw the chuck members 18 into the sleeve 7 to force the prick-points tightly into the artichoke stem, whereupon the lever 23 is released and the chuck 16 allowed to assume its normal position, as shown in Figure 1.

Assuming that the chuck shaft 16, artichoke and guide clutch are being rotated at high speed by the motor 35, the knife 64 normally rests in the dotted position (A) substantially clear of the base of the artichoke, and from this position is brought to the dotted position (B) by manipulation of the hand-wheel 68, at which position the knife starts cutting the base leaves of the artichoke, the full line position (C) indicating the beginning of the semi-ovoidal course traversed by the knife, accomplished by pressure upon the hand lever 86, which causes the screw-feed 79 to move the threaded bearing member 84 along the rod 79, thereby carrying with it the cutter-block 60 through the medium of the pins 78 and 81 traversing the cam-slots 75 of the cam-plate 61, this pressure being continued until the knife has traversed its cutting course throughout, which normally is substantially midway of the artichoke, thereby entirely denuding the artichoke body of its outer heavily laminated leaf-coating, leaving only the edible portion for immediate consumption, or canning. The lever of the stem cutter is now brought into position and the stem severed by the knife 92, thus releasing the trimmed artichoke from the clutches. The screw adjustment of the cam-plate and cutter-block 60, by means of the hand-wheel 68, allows of adjustment of the knife 64 to position for trimming any sized artichoke, without in any manner interfering with the course traversed by the knife in its semi-ovoidal cutting course.

Any means may be employed for returning the knife block and knife to normal position, after the trimming stroke has been completed, but, in the present construction, this means consists of manually returning the parts by forcing the plate 55 along its guideway until the cutter-block and chuck shaft have assumed their normal positions in readiness for the next operation.

The present application is an improved device for the accomplishment of the purpose described and claimed in my former patent application, patented July 17, 1925, No. 1,461,874. In the former construction a rotary-cutter was used, the artichoke remaining stationary, but this construction was found to be impracticable, for the reason that the cutter became clogged with the cut leaves, which greatly reduced the cutter's efficiency and required increased power for driving purposes over that required in the present method of rotating the artichoke in the path of the longitudinally moving cutter or knife, which automatically clears itself and produces a much more perfectly finished product.

Having thus described my invention, I claim, and desire to secure by Letters Patent:

1. An artichoke trimmer comprising a resilient gripping chuck adapted to grip and hold an artichoke to be trimmed, a guide chuck disposed in alignment with the gripping means and adapted for guiding the artichoke, a trimming means in the form of a blade mounted for longitudinal and lateral adjustment relative to the path described by the said artichoke in its rotation, means for rotating said artichoke, and means for causing said trimming blade to travel in a semi-ovoidal course and in contact with said artichoke to cut and trim therefrom the several laminated layers constituting its body covering, substantially as described.

2. An artichoke trimmer comprising resilient gripping means in the form of a chuck and adapted to grip the stem of an artichoke to be trimmed, a spring-pressed guide chuck disposed in alignment with said gripping means, said gripping means and said chuck being adapted to bear and clamp an artichoke therebetween, an adjustable blade adapted for adjustment to position to travel in the described path, means for rotating said artichoke, and means for the actuation of said cutter blade.

3. An artichoke trimmer comprising, a gripping chuck adapted to grip the stem of an artichoke, said chuck being comprised of a plurality of resilient members adapted to normally receive the artichoke stem therebetween, means for rotating said chuck, and means for tightly contracting said resilient chuck members to clamp and hold said stem therewithin.

4. In an artichoke trimmer construction, a gripping chuck adapted to grip the stem of an artichoke, said chuck comprising a plurality of resilient members adapted to receive the artichoke stem therebetween, stem-engaging means mounted upon said resilient members and adapted to enter the positioned stem, means for rotating said chuck, and means for tightly contracting said resilient chuck members to force said stem-engaging means into said stem.

5. An artichoke trimmer comprising resilient gripping means in the form of a chuck and adapted to grip the stem of an artichoke to be trimmed, a spring controlled guide chuck disposed in alignment with said gripping chuck, said gripping chuck and said guide chuck being adapted to align and clamp an artichoke therebetween, an adjustable blade adapted for adjustment to position to thereafter describe a semi-ovoidal course in a horizontal plane and contacting throughout said course with the positioned artichoke, and means for the actuation of said blade.

6. An artichoke trimmer comprising a resilient gripping chuck and a spring controlled guide chuck disposed in alignment therewith for gripping and positioning an artichoke to be trimmed, a trimming blade mounted for lateral and longitudinal adjustment relative to the path described by said artichoke in its rotation, means for rotating said artichoke, and a cam-actuated mechanism for causing said trimming blade to travel in a course substantially corresponding to the contour of the artichoke body and from the stem thereof toward the opposite end.

In testimony whereof I have affixed my signature.

JOSEPH GUERRIERI.